US006480903B1

(12) United States Patent
Voutaz et al.

(10) Patent No.: US 6,480,903 B1
(45) Date of Patent: *Nov. 12, 2002

(54) HARDWARE COMPONENT INTERFACE FOR DESKTOP COMPUTER MANAGEMENT SYSTEMS

(75) Inventors: Kurt E. Voutaz, Spanish Fork, UT (US); Jorge S. Melson, Spring, TX (US); Paul H. McCann, Tomball, TX (US)

(73) Assignee: Compaq Information Technologies Group, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/578,321

(22) Filed: Dec. 26, 1995

Related U.S. Application Data

(60) Provisional application No. 60/002,762, filed on Aug. 24, 1995.

(51) Int. Cl.[7] ................................................. G06F 9/00

(52) U.S. Cl. ....................................... 709/328; 709/331

(58) Field of Search ................................. 395/682, 681, 395/685, 603, 604; 370/249; 709/300, 302, 301, 328, 331, 202, 310, 321

(56) References Cited

U.S. PATENT DOCUMENTS

| | | | | |
|---|---|---|---|---|
| 4,975,829 A | * | 12/1990 | Clarey et al. ............... | 395/500 |
| 5,317,742 A | * | 5/1994 | Bapat ......................... | 395/700 |
| 5,430,845 A | * | 7/1995 | Rimmer et al. ............. | 395/275 |

(List continued on next page.)

OTHER PUBLICATIONS

B. Muralidharan, "Multiprotocol Management Agents: a Look at an Implementation and the Issues to Consider", IEEE J. Selected Areas in Communications, vol. 11, No. 9, Dec. 1993.*

S. F. Wu, et al, "EMOSY: An SNMP Protocol Object Generation for the Protocol Independent MIB", IEEE, pp. 133–144, 1994.*

*Primary Examiner*—Sue Lao
(74) *Attorney, Agent, or Firm*—Akin, Gump, Strauss, Hauer & Feld, L.L.P.

(57) ABSTRACT

A manageable desktop computer system and an associated method for managing a plurality of manageable devices. The computer system includes a storage facility, a registry and a plurality of manageable devices coupled to a hardware component interface (HCI). The HCI includes a dynamic linked library (DLL) which contains a first data structure which describes available management information for each one of the plurality of manageable devices and a function calls area which contains locational information as to where, within the storage facility, the registry or the plurality of manageable devices, the available management information is maintained. A management application which manages the plurality of manageable devices using management information received from the computer system transmits information requests to a management agent which includes a mapper which translates information requests issued by the management application and described using a second data structure into information requests described using the first data structure. The DLL receives the translated requests for information and, using the first data structure and the locational information, retrieves the requested information from either the registry, the storage facility or the manageable device to which the requested information pertains. The retrieved information is then propagated to the mapper for translation into the second data structure and transmission to the management application.

16 Claims, 2 Drawing Sheets

U.S. PATENT DOCUMENTS

| | | | | |
|---|---|---|---|---|
| 5,452,433 A | * | 9/1995 | Mihart et al. | 395/500 |
| 5,475,836 A | * | 12/1995 | Harris et al. | 395/600 |
| 5,522,042 A | * | 5/1996 | Fee et al. | 395/200.01 |
| 5,559,958 A | * | 9/1996 | Farrand et al. | 395/183.03 |
| 5,561,769 A | * | 10/1996 | Kumar et al. | 395/200.05 |
| 5,572,195 A | * | 11/1996 | Heller et al. | 340/825.49 |
| 5,581,478 A | * | 12/1996 | Cruse et al. | 395/505 |
| 5,608,720 A | * | 3/1997 | Biegel et al. | 370/249 |
| 5,608,907 A | * | 3/1997 | Fehskens et al. | 395/672 |

* cited by examiner

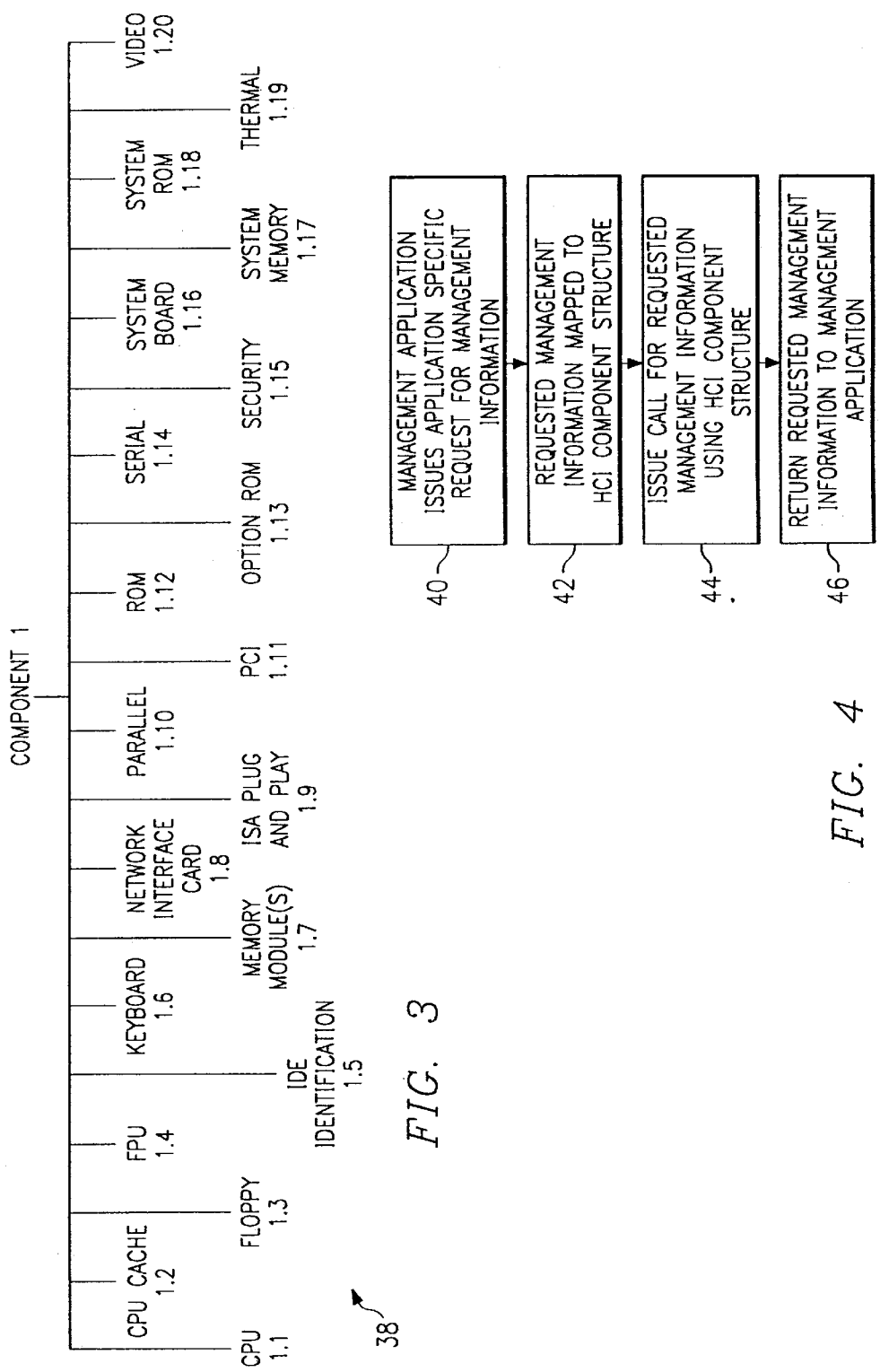

HARDWARE COMPONENT INTERFACE FOR DESKTOP COMPUTER MANAGEMENT SYSTEMS

CROSS REFERENCE TO RELATED APPLICATIONS

This application claims the benefit of U.S. Provisional Application No. 60/002,762 filed on Aug. 24, 1995.

This application is also related to U.S. patent application Ser. No. 08/518,831, filed Aug. 24, 1995, entitled "Method for Performing DFP Operations" and Ser. No. 08/519,104, filed Aug. 24, 1995, entitled "IDE Disk Fault Prediction Virtual Driver". Both of the aforementioned applications are assigned to the Assignee of the present application and hereby incorporated by reference as if reproduced in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to desktop management systems and, more particularly, to a hardware component interface which provides information regarding manageable hardware and software components of a desktop computer system to applications requesting such information.

2. Description of Related Art

A variety of systems for managing manageable devices, i.e., intelligent hardware devices capable of supporting a software configured management agent, have been disclosed in the art. In order to manage a manageable device, the management system must collect information from the device. To collect this information, management systems typically include a management application which interacts with the management agent to extract the desired information from the device. For example, the management application may use the Simple Network Management Protocol (or "SNMP"), a widely used interoperable network management protocol, to retrieve or change the value of items made available by the management agent. The collected information is then processed by the management application, for example, by making the information available for analysis by an administrator. One such management system which is commercially available is commonly referred to as the "Compaq Insight Manager" and is described in U.S. patent application Ser. Nos. 07/933,920 (now U.S. Pat. No. 5,471,617) and 08/060,296, both of which are assigned to the Assignee of the present application and are hereby incorporated by reference as if reproduced in their entirety.

The Compaq Insight Manager utilizes an enterprise management information base (or "MIB") to manage manageable devices. A MIB is a data base that describes a set of items that the management application and agents use to report and control managed devices. Within a MIB is a structure for organizing managed items. To form the structure, the MIB defines a group or groups for organizing related pieces of information. Groups may contain information in the form of items or "objects", sub-groups, or a combination of the two. Similarly, each sub-group is configured like a group. Within a group or sub-group, data may be organized in one of two basic methods—as scalar items or as tables.

A scalar item is a single piece of information that is within a group. For example, the total memory in a server is a scalar item. A table is a structure for organizing data that requires more information to uniquely identify a single data item within a group of similar items. An example of an item that is best organized in a table is an EISA board ID. A MIB may also contain trap definitions. A trap is a notification sent by the SNMP agent to the management application to inform the application about an event that has occurred at the device.

Like the Compaq Insight Manager, other management applications also require a method of obtaining information from management devices. Traditionally, each independent software vendor (or "ISV") who has developed a management application have satisfied this requirement by designing a unique application program interface (or "API") between the management application and the management device. For example, if an ISV developed a management application which needed to know the integrated drive electronics (or "IDE") hard drive serial number, the ISV had to be concerned with I/O ports, the handling of IRQs triggered when the command to the IDE drive was issued and other issues which require device virtualization. Thus, as each ISV has needed to include a significant level of detail regarding each manageable device to be managed by their application, management applications remain both expensive and time consuming to design and limited as to the particular selection of devices for which they are able to manage. Furthermore, these problems are expected to be further aggravated under the Windows 95 operating system released in August, 1995.

Thus, it can be readily seen from the foregoing that it would be desirable to provide a common interface between the manageable devices and the management applications seeking information regarding the devices such that any management application could utilize the interface to receive the information. It is, therefore, the object of this invention to provide such an interface.

BRIEF SUMMARY OF THE INVENTION

In one embodiment, the present invention is of a manageable computer system comprised of a plurality of manageable devices, each of which are coupled to a hardware component interface (HCI) by a corresponding one of a plurality of device drivers. A management application for managing the manageable devices using management information received from the computer system is coupled to the HCI by a management agent. Contained in the HCI is a first data structure which describes management information available for each one of the manageable devices and a pointer to locational information which indicates where, within the computer system, the available management information is maintained. The HCI receives a request for information from the management application and, using the first data structure and the locational information, retrieves the requested information from the computer system. The retrieved information is then propagated to the management application.

In one aspect thereof, a first storage facility is coupled to the HCI. In this aspect, the requested information may be selectively maintained at either the first storage facility or at the manageable device to which the requested information pertains. In another aspect thereof, a second storage facility, such as a registry, is also coupled to the HCI. In this aspect, the requested information may be selectively maintained at either the first storage facility, the second storage facility or at the manageable device to which the requested information pertains.

In further aspects thereof, the HCI may include either a dynamic linked library (DLL) or a DLL and a function calls area. The DLL contains the first data structure which describes available management information for each one of the plurality of manageable devices while the function calls area contains the locational information as to where, within the computer system, the available management information is maintained.

In still further aspects thereof, the first data structure may include a plurality of device branches, a plurality of device branches and a security branch or a plurality of device branches and a thermal branch. Each of the device branches describes the available management information for a corresponding one of the plurality of manageable devices and may include a CPU branch, a CPU cache branch, a floppy drive branch, a FPU branch, an IDE drive branch, a keyboard branch, a memory module branch, a network interface card branch, an ISA plug and play device branch, a parallel port branch, a PCI bus branch, a ROM branch, an option ROM branch, a serial port branch, a system board branch, a system memory branch, a system ROM branch and a video branch. The security branch describes asset security features for the computer system while the thermal branch describes thermal conditions for the computer system.

In yet another aspect thereof, the management agent includes a mapper. The mapper translates management information described by the HCI using the first data structure into a second data structure interpretable by the management application.

In another embodiment, the present invention is of a manageable computer system comprised of a storage facility, a plurality of manageable devices and a hardware component interface (HCI). Each one of the plurality of manageable devices is coupled to the HCI by a corresponding one of a plurality of device drivers. The HCI includes a dynamic linked library (DLL) which contains a first data structure which describes available management information for each one of the plurality of manageable devices, a function calls area, which contains locational information as to where, within the storage facility or the plurality of manageable devices, the available management information is maintained, coupled to the DLL, and a buffer coupled to the storage facility and the plurality of device drivers.

A management application which manages the plurality of manageable devices using management information received from the computer system is coupled to a management agent which includes a mapper coupled to the DLL and the buffer. The mapper translates information requests issued by the management application and described using the second data structure into information requests described using the first data structure. The DLL receives the translated requests for information from the mapper and, using the first data structure and the locational information, retrieves the requested information from either the storage facility or the manageable device to which the requested information pertains for placement in the buffer. The retrieved information is then propagated to the mapper for translation into the second data structure and transmission to the management application.

In one aspect thereof, the first data structure further includes at least one device branch which describes the available management information for a corresponding one of the manageable devices and a security branch which describes asset security features for the computer system. In another aspect thereof, the first data structure further includes at least one device branch which describes the available management information for a corresponding one of the manageable devices and a thermal branch which describes thermal conditions for the computer system.

In another embodiment, the present invention is of a method for managing at least one manageable device using a management application. A data structure is generated for the manageable devices. Requests, issued by the management application, for management information are correlated to the data structure. The requested management information is then retrieved using the correlated request and the retrieved information delivered to the management application. In one aspect thereof, the management information requests issued by the management application are application specific while the data structure for the manageable devices is a non-application specific data structure. In another aspect thereof, requests for management information are correlated to the data structure by translating a description of the application specific request to a corresponding, non-application specific component structure.

BRIEF DESCRIPTION OF THE DRAWING

The present invention may be better understood, and its numerous objects, features and advantages will become apparent to those skilled in the art by reference to the accompanying drawing, in which:

FIG. 3 is a tree illustrating an organizational framework for the hardware component interface of FIG. 2; and FIG. 4 is a flow chart illustrating a method of obtaining management information using the hardware component interface of FIGS. 1–3.

DETAILED DESCRIPTION

The following detailed description is directed to a novel hardware component interface which provides an interface between management applications and a desktop computer system. It should be clearly understood, however, that the disclosed desktop computer system is exemplary in nature and that the hardware component interface set forth below is equally suitable for use with various types of computer systems other than those specifically described herein.

Figure 1:
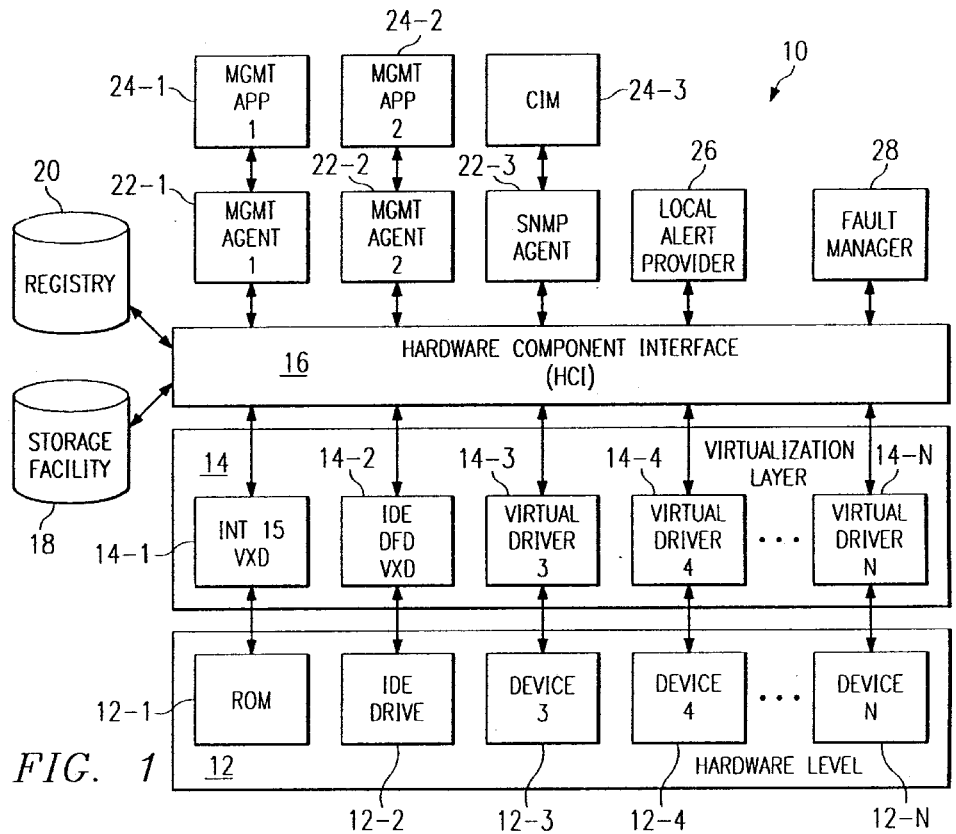
FIG. 1 is a block diagram of a desktop computer system and an associated management architecture for that computer system.

Referring now to FIG. 1, a desktop computer system 10 having a common hardware component interface for management applications and an associated management architecture for such a computer system will now be described in greater detail. The computer system 10 includes a hardware level 12 comprised of plural manageable devices 1-21 through 12-N to be managed by a management application in a manner more fully described below through a hardware component interface (or "HCI") 16. The manageable devices included in the hardware level 12 are ROM 12-1, IDE 12-2, as well as any number of other manageable devices such as parallel ports, video, SCSI drives and others typically included in a desktop computer system. It should be noted, however, that while the manageable devices 12-1 through 12-N comprising the hardware level 12 are those devices typically included in a desktop computer, it is specifically contemplated that the hardware level 12 may be modified to include additional computer systems as well as other manageable network devices such as bridges, routers and concentrators.

The HCI 16 is coupled to the hardware level 12 by a virtualization layer 14 comprised of a series of virtual drivers 14-1 through 14-N, each of which corresponds to one of the manageable devices 12-1 through 12-N included in the hardware level 12. Generally speaking, a virtual driver (or "VXD") is a software interface which controls the exchange of messages between an application and a device. The INT 15 VXD 14-1 is commercially available code which allows access to the ROM 10-1 while the desktop computer 10 is running the Windows 95 operating system. The IDE disk fault prediction (or "DFP") VXD 14-2 includes plural software routines, each of which handles selected portions of I/O exchanges between a DFP application and the IDE drive 12-2. The IDE DFP VXD 12-2 is described in greater detail in co-pending U.S. patent application Ser. No. 08/519,104, filed Aug. 24, 1995 and previously incorporated by reference. Similarly, virtual drivers 14-3 through 14-N provide respective software interfaces between the corresponding device 12-3 through 12-N and the HCI 16.

The HCI 16 is a software interface which provides a "loose" coupling between various management applications to be described in greater detail below and the various manageable devices provided at the hardware level 12 which are to be managed by the application. The term "loose" coupling refers to the feature that the management application does not need to know where a selected manageable device holds certain pieces of information typically requested by a management application. Instead, the management application will request the information from the HCI 16. In turn, the HCI 16 will retrieve the requested information, either from the manageable device itself or from a storage facility. The HCI 16 is coupled to two such storage facilities, disk file 18 and Windows 95 registry 20, either of which may hold selected management information.

Continuing to refer to FIG. 1, any number of management applications may be coupled to the HCI 16 by a corresponding management agent. For example, FIG. 1 illustrates first and second management applications 24-1 and 24-2 respectively coupled to the HCI 16 by management agents 22-1 and 22-2. For example, a DMI agent would be suitable for the uses contemplated herein. Of course, the particular number of management applications illustrated as coupled to the HCI 16 is purely exemplary and it is specifically contemplated that any number of management applications may be coupled to the HCI 16. In alternate embodiments thereof, the management applications 24-1 and 24-2 may be directly coupled to the HCI 16 or indirectly coupled to the HCI 16 via a management interface such as the Microsoft Management Interface (or "MMI") (not shown). A third management application 24-3, commonly known as the "Compaq Insight Manager" (or "CIM") and described in U.S. patent application Ser. Nos. 07/933,920 (now U.S. Pat. No. 5,471, 617) and 08/060,296 is coupled to the HCI 16 by a SNMP agent 22-3. Finally, the management architecture for the computer system 10 also includes a local alert provider 26 and a fault manager 28. The local alert provider 26 receives fault messages from the HCI 16 related to drive faults and thermal conditions and issues a local alert, for example, using a pop-up dialog box. The fault manager 28 polls for IDE drive and thermal faults and posts a message upon detection of a fault condition.

Figure 2:
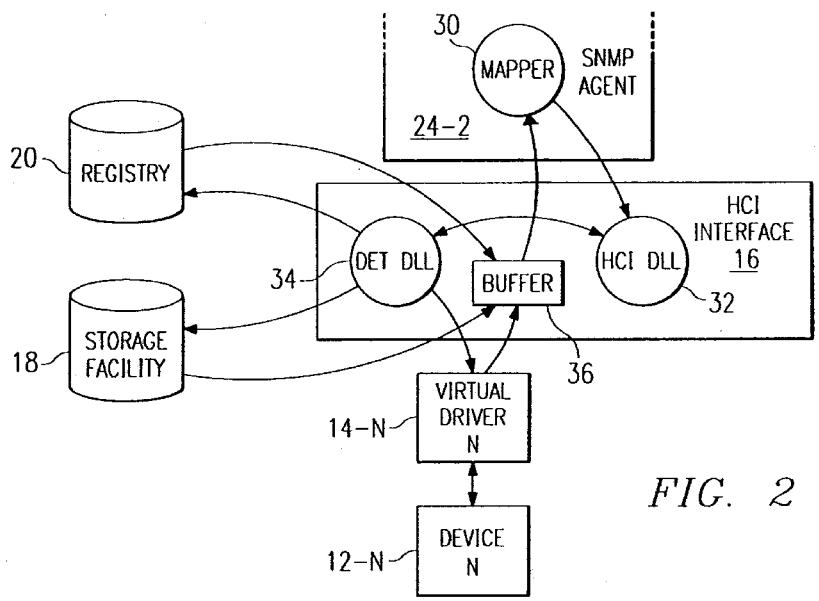
FIG. 2 is an expanded block diagram of a portion of the computer system of FIG. 1 which illustrates a hardware component interface between a management application and a manageable device.

Referring next to FIG. 2, the software agents residing in the management agents 22-1 through 22-N and the HCI 16 which accomplish the retrieval of requested management information will now be described in greater detail. In this regard, however, it should be clearly understood that, while the present description is directed to the retrieval of management information requested by the CIM management application 24-3, it should be clearly understood that the foregoing description is equally applicable to the processes by which other management applications retrieve requested information or by which the CIM management application or other management applications sets requested information.

More specifically, the CIM management application 24-3 requests management information by identifying the CIM management information base (or "MIB") definition for the desired information to the mapper 30 of the SNMP agent 22-3. For example, if a description of the serial ports of the computer system 10 is desired, the CIM management application 24-3 will issue a request for the serialPortTable object located at branch 232.1.2.9.1 of the serial port child group of the CIM MIB. The mapper 30 translates the MIB description of the requested information into HW_SERIAL, the corresponding HCI component structure definition. Translation of the CIM MIB definition to its corresponding HCI component structure definition may be accomplished by various means, for example, using a conventional look-up table.

It is contemplated that the management agents 22-1 and 22-2 should also include a similarly configured mapper capable of translating descriptions of requested management information issued by the management application 24-1 and 24-2 coupled thereto, to the corresponding HCI component structure definition for the management information.

The mapper 30 then transfers the HCI component structure to the HCI dynamic linked library (or "DLL") 32. For each HCI component structure received thereby, a pointer 33 points to corresponding calling conventions and parameters maintained in function calls area 34 of the HCI 16 which are required in order to retrieve the requested management information described by the HCI component structure. Using the information contained within the call pointed to by the HCI DLL 32, the HCI DLL 32 retrieves the requested management information. Depending on the particular call pointed to by the HCI DLL 32, the HCI DLL 32 will retrieve the requested management information from either one of the devices 12-1 through 12-N, the storage facility 18 or the. registry 20. More specifically, for each HCI component structure received by the HCI DLL 32, the function calls area 34 contains a location, either within one of the devices 12-1 through 12-N, the storage facility 18 or the registry 20 where the requested management information described by the HCI component structure received by the HCI DLL 32 is held.

In this manner, the HCI DLL 32 may selectively retrieve information from the registry 20, the storage facility 18 or the manageable device 12-N by placing the requested management information maintained by either the registry 20, storage facility 18 or management device 12-N into data buffer 36 for transfer to the management application originating the management information request, in the present example, the CIM management application 24-3, through the management agent, in the present example, the SNMP agent 22-3.

If the requested management information is maintained by the device 12-N, the HCI DLL 34 will access the device 12-N using the virtual driver 14-N and place the requested management information in the data buffer 36. Of course, if the requested management information is maintained by the ROM 12-1 or the IDE drive 12-2, the HCI DLL 34 will respectively access the ROM 12-1 or the IDE drive 12-2 and place the requested management information in the data buffer 36 by, way of the INT 15 VXD 14-1 or the IDE DFP VXD 14-2.

Referring next to FIG. 3, the HCI component structure 38 which allows plural management applications 24-1 through 24-3 to be loosely coupled with manageable devices 12-1 through 12-N located at the hardware level 12 will now be described in greater detail. The HCI component structure 38 is organized to include a plurality of branches 1.1 through 1.14, each describing a manageable device included in the desktop computer system 10, which extend from a component node 1 of the HCI component structure 38. Branches which extend from the component node 1 include a CPU branch 1.1, a CPU cache branch 1.2, a floppy branch 1.3, an FPU branch 1.4, an IDE identification branch 1.5, a keyboard branch 1.6, a memory module branch 1.7, a network interface card branch 1.8, an ISA plug and play branch 1.9, a parallel branch 1.10, a PCI branch 1.11, a ROM branch 1.12, an option ROM branch 1.13, a serial branch 1.14, a security branch 1.15, a system board branch 1.16, a system memory branch 1.17, a system ROM branch 1.18, a thermal branch 1.19 and a video branch 1.20.

The CPU branch 1.1 contains information regarding the central processing unit (or "CPU") found in the computer system 10 such as the name, speed and step revision of the processor. The formal structure of the CPU branch 1.1 is as follows:
Input Hardware ID: HW_CPU
Input index structure:
  None.
Output structure: The CPU structure contains information about the central processing unit (CPU) found in the machine.
  struct CPU {
    BYTE CPU_Name[DESCRIPTION_LEN];
    LONG CPU_Speed;
    DWORD CPU_Step;
  };
Members
  CPU_Name
    The name of this processor. For example "80486 DX4".
  CPU_Speed
    This is speed in megahertz of this processor.
    This will be zero (0) if this value is not available.
  CPU_Step
    The step revision of the processor.
    This will be zero (0) if this value is not available.
©1995 Compaq Computer Corporation
  The CPU cache branch 1.2 contains information regarding the CPU cache of the computer system 10 such as the size and speed of the CPU cache. The formal structure of the CPU cache branch 1.2 is as follows:
Input Hardware ID: HW_CPU_CACHE
Input index structure:
  None.
Output structure: The CPU_CACHE structure contains information about to the CPU caches in the system. Use the HW_CPU_CACHE hardware ID to obtain this structure.
  struct CPU_CACHE {
    DWORD dwCCACHE_Size;
    DWORD dwCCACHE_Speed;
  };
  CACHE_Size The size of the cache in kilobytes.
  CACHE_Speed
    This is speed in cache memory in nanoseconds (ns). A value of zero (0) means that the cache speed is unknown or unobtainable.
©1995 Compaq Computer Corporation
  The floppy branch 1.3 contains information regarding the floppy drive or drives of the computer system 10 such as drive type and swapping. The formal structure of the floppy branch 1.3 is as follows:
Input Hardware ID: HW_FLOPPY
Input index structure: struct FLOPPY_INDEX_STRUC
  {
    FLOPPY_DRIVE_INDEX FLOPPY_Index;
  }
FLOPPY_Index
  Floppy drive index as follows:

| Value | Meaning |
| --- | --- |
| FLOPPY_DRIVE_A | Used for logical floppy drive A: |
| FLOPPY_DRIVE_B | Used for logical floppy drive B: |

Output structure:
  The FLOPPY structure contains information about the floppy types in the machine.
  struct FLOPPY {
    FLOPPY_TYPE FLOPPY_Type;
    BOOL bFLOPPY_Swapped;
  }
FLOPPY_Type
  Floppy drive type as follows:

| Value | Meaning |
| --- | --- |
| FLOPPY_NOT_PRESENT | Floppy drive associated with FLOPPY_Index is not present |
| FLOPPY_360 | 360 Kbyte floppy drive present |
| FLOPPY_12 | 1.2 Mbyte floppy drive present |
| FLOPPY_720 | 720 Kbyte floppy drive present |
| FLOPPY_144 | 1.44 Mbyte floppy drive present |
| bFLOPPY_Swapped | Boolean which indicated if the floppy drives have been swapped. |

©1995 Compaq Computer Corporation
  The FPU branch 1.4 contains information regarding the floating point unit (or "FPU") of the computer system 10 such as name and type of the FPU. The formal structure of the FPU branch 1.4 is as follows:
Input Hardware ID: HW_FPU
Input index structure:
  None.
Output structure:
The FPU structure contains information about the floating point unit (FPU).
  struct FPU {char szFPU_Name[FPU_NAME_LEN];
    FPU_TYPEFPU_Type;
  };

Members
  szFPU_Name
    This is the name of the FPU. For example: 80387 Weitek 3167
  FPU_Type
    This value indicates if the FPU this entry is describing is embedded in the CPU or external to the CPU chip.

| Value | Meaning |
| --- | --- |
| FPU_EMBEDDED | The unit in embedded on the main CPU. |
| FPU_EXTERNAL | The unit is external to the main CPU. |

©1995 Compaq Computer Corporation

The IDE identification branch 1.5 contains identification information regarding the IDE drive of the computer system 10 such as type, number of drive cylinders, number of heads, number of sectors, drive capacity, bit map, DFP support, DFP condition, DFP attribute IDs, DFP threshold counts, DFP current counts, serial number, firmware version and model. The formal structure of the IDE identification branch 1.5 is as follows:

Input Hardware ID: HW_IDE_DFP
  Input index structure: struct IDE_DFP_INDEX {
    DWORDdwIDE_DriveIndex;
  }
Members
  dwIDE_DriveIndex Drive controller index as follows:

| Value | Meaning |
| --- | --- |
| IDE_CONTROLLER_0_DRIVE_0 | The first drive on the first controller. |
| IDE_CONTROLLER_0_DRIVE_1 | The second drive on the first controller. |
| IDE_CONTROLLER_1_DRIVE_0 | The first drive on the second controller. |
| IDE_CONTROLLER_1_DRIVE_1 | The second drive on the second controller. |

Output structure:
  The IDE_IDENT structure contains integrated drive electronics (IDE) drive identification information.
  struct IDE DFP {
    BOOLbIDE_DrivePresent;
    BYTEbyIDE_DriveType;
    DWORDdwIDE_DriveCylinders;
    DWORDdwIDE_Heads;
    DWORDdwIDE_Sectors;
    DWORDdwIDE_Capacity;
    DWORDdwIDE_LogicalDriveMap;
    BOOLbIDE_DFPDriveSupported;
    DWORDdwIDE_DFPCondition;
    BYTEbyIDE_FailedAttrib;
    BYTEbyIDE_ThresholdCount;
    BYTEbyIDE_CurrentCount;
    charszIDE_SerialNumber[IDE_SERIAL_NUM_LEN];
    charszIDE_FirmWareVer[IDE_FW_VER_LEN];
    charszIDE_Model[IDE_MODEL_LEN];
Members
  bIDE_DrivePresent
    Boolean which indicates whether or not the drive is present.
  byIDE_DriveType
    BIOS drive type
  dwIDE_DriveCylinders
    Number of drive cylinders
  dwIDE_Heads
    Number of heads
  dwIDE_Sectors
    Number of sectors
  dwIDE_Capacity
    Drive capacity in megabytes
  dwIDE_LogicalDriveMap
    Bit map of the logical drives associated with this physical drive letter.
  bIDE_DFPDriveSupported
    Boolean which indicates whether or not this drive supports the drive fault protection mechanism.
  dwIDE_DFPCondition
    The condition of the IDE drive.
  This object represents the status IDE drive described by this entry as follows:

| Value | Meaning |
| --- | --- |
| IDE_DRIVE_OK | The IDE hard drive is fully functional. No user action is required. |
| IDE_DRIVE_DEGRADED | The IDE hard drive is experiencing difficulties. The user should backup all data and have the drive repaired. | byIDE_FailedAttrib
    The current attribute ID defined as follows:

| Attribute ID Number | Attribute Name |
| --- | --- |
| 0 | Indicates that this entry in the data structure is not used |
| 1 | Raw Read Error Date |
| 2 | Throughput Performance |
| 3 | Spin Up Time |
| 4 | Start/Stop Count |
| 5 | Re-allocated Sector Count |
| 6 | Read Channel Margin |
| 7 | Seek Error Rate |
| 8 | Seek Time Performance |
| 9 | Power-On Hours Count |
| 10 | Spin Retry Count |
| 11 | Drive Calibration Retry Count |
| 12 | Drive Power Cycle Count |
| 13–199 | Reserved Attributes |
| 200–255 | Vendor Unique Attributes | byIDE_ThresholdCount
    Limits for each drive attribute value, above which a drive is, for warranty purposes, deemed to have failed, even though it may still be operational. In addition to the actual threshold value the following values may also be defined.
  byIDE_CurrentCount Current warranty failure threshold count. Range values as follows:

| | |
|---|---|
| 0x00 | "always failing" threshold value to be used for code test purposes |
| 0x01 | minimum value for normal operation |
| 0xFD | maximum value for normal operation |
| 0xFE | invalid for threshold value-not to be used |
| 0 × FF | "always passing" threshold value to be used for code test purposes. | szIDE_SerialNumber
  Compaq IDE Drive Serial Number.
  This is the drive serial number and can be used for identification purposes.
szIDE_FirmWareVer Compaq IDE Firmware Version.
  This is the version of the firmware on the IDE drive. If the IDE drive firmware version is unavailable, then this string will be zero (0).
szIDE_Model
  Compaq IDE Drive Model. This is the drive model name and can be used for identification.
©1995 Compaq Computer Corporation The keyboard branch 1.6 contains information which describes the keyboard attached to the computer system 10. The formal structure of the keyboard branch 1.6 is as follows:
  Input Hardware ID:
  HW_KEYBOARD
  Input index structure:
    None.
  Output structure:
  The KEYBOARD structure contains a description of the keyboard attached to the system.
  struct KEYBOARD {
    CHARKybrd_Desc[DESCRIPTION_LEN];
  }
Member
  Kybrd_Desc
    A description of the keyboard.
©1995 Compaq Computer Corporation The memory module branch 1.7 contains information regarding the system memory for the computer system 10 such as amount, type and speed. The formal structure of the memory module branch 1.7 is as follows:
  Input Hardware ID:
  HW_MEM_MODULE
  Input index structure:
    None.
  Output structure:
  The MEMORY structure contains information about the machines system memory.
  struct MEM_MODULE {
    BYTE byMEMMOD_Size;
    BYTE byMEMMOD_Type;
    BYTE byMEMMOD_Speed;
  }
  The MEMORY structure contains information about the available memory on the machine.
Members
  byMEMMOD_Size
    The total amount of memory in the machine in kilobytes.
  byMEMMOD_Type Memory type defined as follows:

| Value | Meaning |
|---|---|
| MEM_SIMM | Single in-line memory module |
| MEM_PCMCIA | A memory card designed by the Personal Computer Memory Card International Association (PCMCIA) typically used on a portable computer. |
| MEM_COMPAQ | Compaq proprietary memory module. | byMEMMOD_Speed
    Speed of memory in nanoseconds.
©1995 Compaq Computer Corporation The network interface card branch 1.8 contains information regarding the network interface card associated with the computer system 10. The formal structure of the network interface card branch 1.8 is as follows:
  Input Hardware ID: HW_NIC
  Input index structure:
  struct NIC_INDEX {
    DWORDdwNIC_BoardIndex;
    DWORDdwNIC_DeviceIndex;
  }
Members
  dwNIC_BoardIndex
    The zero based board index associated with the network interface card.
  dwNIC_DeviceIndex
    The zero based device index associated with this device.
  Output structure:
  struct NIC {
    WORD woNIC_NumMemWindows;
    DWORD adwNIC_MemBase[NIC_MAX_MEM_REGISTERS];
    DWORD adwNIC_MemLength[NIC_MAX_MEM_REGISTERS];
    WORD awoNIC_MemAttrib[NIC_MAX_MEM_REGISTERS];
    WORD woNIC_NumIOPorts;
    WORD awoNIC_IOPortBase[NIC_MAX_IO_PORTS];
    WORD awoNIC_IOPortLength[NIC_MAX_IO_PORTS];
    WORD woNIC_NumIRQs;
    BYTE abyNIC_IRQRegisters[NIC_MAX_IRQS];
    BYTE abyNIC_IRQAttrib[NIC_MAX_IRQS];
    WORD woNIC_NumDMAs;
    BYTE abyNIC_DMALst[NIC_MAX_DMA_CHANNELS];
    WORD awoNIC_DMAAttrib[NIC_MAX_DMA_CHANNELS];
    char szNIC_DeviceName[NIC_MAX_DEVICE_LEN];
  }
  woNIC_NumMemWindows
    Number of base memory windows.
  adwNIC_MemBase
    Array of memory window bases.
  adwNIC_MemLength
    Array of memory windows lengths.

awoNIC_Reserved1
    Array of words reserved for use.
woNIC_NumIOPorts
    Number of input/output ports.
awoNIC_IOPortBase
    Array of input/output base port addresses.
awoNIC_IOPortLength
    Array of input/output base lengths.
woNIC_NumIRQs
    Number of interrupt requests
abyNIC_IRQRegisters
    Array of interrupt request registers.
abyNIC_Reserved2
    Array of words reserved for use.
woNIC_NumDMAs
    Number of DMA channels.
abyNIC_DMALst
    Array of DMA lists.
awoNIC_Reserved3
    Array of words reserved for use.
szNIC_DeviceName
    The ASCIIZ description of network interface card.
©1995 Compaq Computer Corporation The ISA plug and play branch 1.9 contains information regarding plug and play devices installed in the computer system 10. The formal structure of the ISA plug and play branch 1.9 is as follows:

Input Hardware ID:
HW_PNP
Input index structure:
struct PNP_INPUT {
    DWORD dwPNP_BoardIndex;
    DWORD dwPNP_DeviceIndex;
}.
Members
    dwPNP_BoardIndex
        The zero based board index associated with the network interface card.
    dwPNP_DeviceIndex
        The zero based device index associated with this device.
Output structure:
struct PNP_INFO {
    WORD PNP_NumMemWindows;
    DWORD dwPNP_MemBase[PNP_MAX_MEM_REGISTERS];
    DWORD dwPNP_MemLength[PNP_MAX_MEM_REGISTERS-];
    WORD woPNP_MemAttrib[PNP_MAX_MEM_REGISTERS];
    WORD woPNP_NumIOPorts;
    WORD awoPNP_IOPortBase[PNP_MAX_IO_PORTS];
    WORD awoPNP_IOPortLength[PNP_MAX_IO_PORTS];
    WORD woPNP_NumIRQs;
    BYTE abyPNP_IRQRegisters[PNP_MAX_IRQS];
    BYTE abyPNP_IRQAttrib[PNP_MAX_IRQS];
    WORD woPNP_NumDMAs;
    BYTE abyPNP_DMALst[PNP_MAX_DMA_CHANNELS];
    WORD awoPNP_DMAAttrib[PNP_MAX_DMA_CHANNELS];
    char szPNP_DeviceName[PNP_MAX_DEVICE_LEN];
}
woPNP_NumMemWindows
    Number of base memory windows.
adwPNP_MemBase
    Array of memory window bases.
adwPNP_MemLength
    Array of memory windows lengths.
awoPNP_Reserved1
    Array of words reserved for use.
woPNP_NumIOPorts
    Number of input/output ports.
awoPNP_IOPortBase
    Array of input/output base port addresses.
awoPNP_IOPortLength
    Array of input/output base lengths.
woPNP_NumIRQs
    Number of interrupt requests
abyPNP_IRQRegisters
    Array of interrupt request registers.
abyPNP_Reserved2
    Array of words reserved for use.
woPNP_NumDMAs
    Number of DMA channels.
abyPNP_DMALst
    Array of DMA lists.
awoPNP_Reserved3
    Array of words reserved for use.
szPNP_DeviceName
    The ASCIIZ description of network interface card.
©1995 Compaq Computer Corporation The parallel branch 1.10 contains information regarding the parallel ports for the computer system 10. This information includes number of parallel ports and their addresses. The formal structure of the parallel branch 1.10 is as follows:

Input Hardware ID: HW_PARALLEL
Input index structure: struct PARALLEL_INDEX {
    PARALLEL_PORT PARA_PortIndex;
Members
    PARA_PortIndex
        Parallel port index as follows:

| Value | Meaning |
| --- | --- |
| PARALLEL_PORT_0 | First parallel port found in the machine. |
| PARALLEL_PORT_1 | Second parallel port found in the machine. |
| PARALLEL_PORT_2 | third parallel port found in the machine. |

Output structure: The PARALLEL_PORT structure contains information about parallel ports in the system.
Members
    struct PARALLEL {
        BOOL bPARALLEL_present;
        char szPARALLEL_Description[PARALLEL_DESC_LEN];
        WORD woPARALLEL_IOPortAddr;
    }
bPARALLEL_present
    Boolean valued which indicates whether or not a parallel port is present for a given PARA_PortIndex.

szPARALLEL_Description
A text description of further information known about the parallel port. This may be an empty string if no further information is known.
woPARALLEL_IOPortAddr
The I/O port address used by this parallel port.
struct PARALLEL_INDEX {
  PARALLEL_PORT PARA_PortIndex;
}
PARA_PortIndex
Parallel port index as follows:

| Value | Meaning |
|---|---|
| PARALLEL_PORT_0 | Indicates the first parallel port device. |
| PARALLEL_PORT_1 | Indicates the second parallel port device. |
| PARALLEL_PORT_2 | Indicates the third parallel port device. |

©1995 Compaq Computer Corporation

The PCI branch 1.11 contains output information for the peripheral component interconnect (or "PCI") bus, as well as devices residing on the PCI bus, for the computer system 10. The formal structure of the PCI branch 1.11 is as follows:
  Input Hardware ID: HW_PCI, HW_PCI_NEXT
  Input index structure: struct PCI_INDEX {
    PCI_FUNC_IDX PCI_IDX_FuncID;
  }
Members
  PCI_IDX_FuncID
    PCI index function id structure as defined below.
  struct PCI_FUNC_IDX {
    PCI_FUNC_ID PCI_Id;
    BOOL bPCI_FindFirst;
    BOOL bPCI_NoBridges;
    BYTE byPCI_MemIdx;
  }
Members
  PCI_Id
    Uniquely defines the PCI slot, device, and function requested.
  bPCI_FindFirst
    Indicates if find first should be done.
  bPCI_NoBridges
    Indicates if bridges should be filtered in find next.
  byPCI_MemIdx
    Memory entry index.
  struct PCI_FUNC_ID {
    BYTEbyBus;
    BYTEbyDevice;
    BYTEbyFunc;
  }
Members
  byBus
    PCI bus number (0 . . . 255) that uniquely selects the PCI bus.
  byDevice
    PCI device number (0 . . . 31) that uniquely selects a device on a PCI bus.
  byFunc
    Function number (0 . . . 7) that uniquely selects a device on a PCI bus.

Output structure(s):
The PCI_INFO structure contains the output information for a given Peripheral Component Interconnect (PCI) PCI_FUNC_ID input structure.
struct PCI_INFO {
  PCI_FUNC_ID PCI_IDX_FuncID;
  WORDwoPCI_VendorID;
  WORDwoPCI_DeviceID;
  CLASS_CODE PCI_ClassCode;
  charszPCI_ClassDescription[CLASS_DESC_LEN];
  BYTEbyPCI_RevID;
  BOOLbPCI_DeviceFuncEnabled;
  BYTEbyPCI_IntLine;
  BYTEbyPCI_IntPins;
  BYTEbyPCI_MinGrant;
  BYTEbyPCI_MaxLatency;
    WORD woPCI_SubSysVendorId;
  WORD woPCI_SubSysId;
  char szPCI_DeviceId[UNCOMPRESS_PCI_ID_LEN];
    char szPCI_DeviceName[DEVICE_DESC_LEN];
  BYTE byPCI_PhySlot;
}
Members
  PCI_IDX_FuncID
    Corresponds to the PCI_FUNC_ID input structure.
  woPCI_VendorID
    A predefined field in configuration space that (along with Device ID) uniquely identifies the device.
  woPCI_DeviceID
    A predefined field in configuration space that (along with Vendor ID) uniquely identifies the device.
  PCI_ClassCode
    The base class, code, sub-class code, and register-level programming interface (if any). Refer to the CLASS_CODE structure defined below for complete explanation.
  szPCI_ClassDescription
    The ASCIIZ description of the class.
  byPCI_RevID
    Revision ID.
  bPCI_DeviceFuncEnabled
  byPCI_IntLine
    Interrupt line routing.
  byPCI_IntPins
    Interrupt pints used by device/device functions (INTA . . . INTD)
  byPCI_MinGrant
    Mimimum burst period needed.
  byPCI_MaxLatency
    Maximum latency.
  woPCI_SubSysVendorId
    Subsystem vendor ID as obtained from the PCI special interest group (SIG).
  woPCI_SubSysId
    Vendor specific subsystem ID.
  szPCI_DeviceId
    An ID allocated by the vendor which uniquely identifies the device on the board.
  szPCI_DeviceName
    ASCIIZ description of the device name.
  byPCI_PhySlot
    Zero based physical slot number.
  struct PCI_MEM_INFO {

```
BYTE byPCI_Type;
DWORD dwPCI_Base;
DWORD dwPCI_Size;
}
```
byPCI_Type
The PCI address range types defined as follows:

| Value | Meaning |
| --- | --- |
| PCI_ADDR_MEM | Memory mapped address space. |
| PCI_ADDR_IO | I/O mapped address space. |
| PCI_ADDR_EXP_ROM | Expansion ROM address space. |
| dwPCI_Base | Base address range. |
| dwPCI_Size | Size from base address range. |

```
struct PCI_FUNC_IDX {
   PCI_FUNC_ID PCI_Id;
   BOOL bPCI_FindFirst;.
   BOOL bPCI_NoBridges;
   BYTE byPCI_MemIdx
}
```
PCI_Id
bPCI_FindFirst
Indicates if find first should be done.
bPCI_NoBridges
Indicates if bridges should be filtered in find next
byPCI_MemIdx
Memory entry index.
```
struct CLASS_CODE {
   BYTE byProgIf;
   BYTE bySubClass;
   BYTE byBaseClass;
```
Members
byProgIf
Programming interface.
bySubClass
Device subclass. Defined as follows

| Value | Meaning |
| --- | --- |
| Mass storage controllers | |
| SUB_MASS_STO_SCSI | SCSI bus controller |
| SUB_MASS_STO_IDE | IDE controller |
| SUB_MASS_STO_FLOPPY | Floppy controller |
| SUB_MASS_STO_IPI | IPI controller |
| Network controllers | |
| SUB_NET_ETHER | Ethernet controller |
| SUB_NET_TOKEN | Token ring controller |
| SUB_NET_FDDI | FDDI controller |
| SUB_NET_OTHER | Other network controller |
| Display controllers | |
| SUB_DSP_VGA | VGA compatible controller |
| SUB_DSP_XGA | XGA controller |
| SUB_DSP_OTHER | Other display controller |
| Multimedia controllers | |
| SUB_DSP_VIDEO | Video device |
| SUB_DSP_AUDIO | Audio device |
| SUB_DSP_OTHER | Other multimedia device |
| Memory controllers | |
| SUB_MEM_RAM | RAM |
| SUB_MEM_FLASH | Flash |
| SUB_MEM_OTHER | Other memory controller |

| Value | Meaning |
| --- | --- |
| Bridge device subclasses | |
| SUB_BRIDGE_HOST | Host bridge |
| SUB_BRIDGE_ISA | ISA bridge |
| SUB_BRIDGE_EISA | EISA bridge |
| SUB_BRIDGE_MCA | MCA bridge |
| SUB_BRIDGE_PCI | PCI-to-PCI bridge |
| SUB_BRIDGE_PCMCIA | PCMCIA bridge |
| SUB_BRIDGE_OTHER | Other bridge device | byBaseClass
Device baseclass. Defined as follows

| Value | Meaning |
| --- | --- |
| BASE_COMPAT | Device built before class code definitions were finalized. This type is defined to provide backward compatibility. |
| BASE_MASS_STO | Mass Storage controller |
| BASE_NET | Network controller |
| BASE_DSP | Display controller |
| BASE_MM | Multixuedia device |
| BASE_MEM | Memory controller |
| BASE_BRIDGE | Bridge device |

This structure is the PCI configuration space common header.
```
struct PCI_CFG_COMMON_HDR {
   WORD woVendorId;
   WORD woDeviceId;
   WORD woCommand;
   WORD woStatus;
   BYTE byRevId;
   BYTE byCacheLineSize;
   CLASS_CODE ClassCode;
   BYTE byLatencyTimer;
   BYTE byHeaderType;
   BYTE byBIST;
}
```
woVendorId
This field identifies the manufacturer of the device. Valid vendor identifiers are allocated by a central authority to ensure uniqueness. OFFFFH is an invalid value for vender ID.
woDeviceId
This field identifies the particular device.
This identifier is allocated by the vendor.
woCommand
Command register.
woStatus
Status register.
byRevId
Revision identification.
byCacheLineSize
Cache line size in 32-bit units.
ClassCode
Class code bytes.
byLatencyTimer
Latency timer in PCI bus clock units.
byHeaderType
Header type.

byBIST
  Built-in self test control.
struct PCI_CFG_HDR_00 {
  PCI_CFG_COMMON_HDR Common;
  DWORD dwBaseAddrRegs[BASE_REGS_DW_CNT];
  DWORD dwReserved1;
  DWORD dwReserved2;
  DWORD dwExpRomBaseAddr;
  DWORD dwReserved3;
  DWORD dwReserved4;
  BYTE byIntLine;.
  BYTE byIntPin;
  BYTE byMinGrant;
  BYTE byMaxLatency;
}
Members
  Common
    Common part of all header types.
  dwBaseAddrRegs
    Base address registers
  dwReserved1
    Reserved.
  dwReserved2
    Reserved.
  dwExpRomBaseAddr
    Expansion ROM base address register
  dwReserved3
    Reserved.
  dwReserved4
    Reserved.
  byIntLine
    Interrupt line routing.
  byIntPin
    Interrupt bit used by device functions.
  byMinGrant
    Minimum burst period needed.
  byMaxLatency
    Maximum latency.
  struct PCI_FUNC_ID {
    BYTEbyBus;
    BYTEbyDevice;
    BYTEbyFunc;
  }
Members
  byBus
    PCI bus number (0 . . . 255) that uniquely selects the PCI bus.
  byDevice
    PCI device number (0 . . . 31) that uniquely selects a device on a PCI bus.
  byFunc
    Function number (0 . . . 7) that uniquely selects a device on a PCI bus.
©1995 Compaq Computer Corporation The ROM branch 1.12 contains a description of the system ROM for the computer system 10 which includes information such as system ROM version and BIOS information. The formal structure of the ROM branch 1.12 is as follows:
  Input Hardware ID:
  HW_SYS_ROM
  Input index structure:
  None.
  Output structure:
  The ROM structure contains a description of the system ROM.
  struct ROM {
    CHARROM_SysVer[DESCRIPTION_EN];
    BYTEROM_BiosDataArea[DESCRIPTION_LEN];
  }
Members
  ROM_SysVer
    System ROM version information.
  ROM_BiosDataArea
    The BIOS ROM data area. This may be the current contents or a copy of the BIOS ROM data area from when the Insight Agent was initialized.
©1995 Compaq Computer Corporation The optionRom branch 1.13 contains information regarding the option Rom for the computer system 10 such as the size of the option ROM. The formal structure of the option ROM branch 1.13 is as follows:
  Input Hardware ID:
  HW_OPTION_ROM
  Input index structure:
  None.
  Output structure:
  The OPTION_ROM structure contains information on the option ROM in the system.
  struct OPTION_ROM {
    LONGOpt_RomAddrIndex;
    LONGOpt_RomSize;
  };
Members
  Opt_RomAddrIndex
    An option ROM description.
  Opt_RomSize
    The size in bytes of the option ROM.
©1995 Compaq Computer Corporation The serial branch 1.14 contains information such as I/O address values for the serial ports for the computer system 10. The formal structure of the serial branch 1.14 is as follows:
  Input Hardware ID:
  HW_SERIAL
  Input index structure:
  None.
  Output structure:
  The SERIAL_PORT structure contains information about serial ports in the system.
  struct SERIAL {
    BOOL bSERIAL_present;
    char szSERIAL_Description[SERIAL_DESC_LEN];
    WORD woSERIAL_IOPortAddr;
  };
Members
  bSERIAL_present
    The boolean which indicates if the serial port associated with SERIAL_PORT is present.
  szSERIAL_Description
    The ASCIIZ description of the serial port.
  woSERIAL_IOPortAddr
    The input/output address value of the serial port, e.g. 0×3F8.
©1995 Compaq Computer Corporation The security branch 1.15 contains configuration information regarding various security features for the computer system 10 used to control access to the computer system 10. The formal structure of the security branch 1.15 is as follows:

Input Hardware ID:
HW_SECURITY
Input index structure:
  None.
Output structure:
  The SECURITY structure contains configuration information about the asset security features on your Compaq computer.

```
struct SECURITY {
    char szSec_SysSerialNumber[SEC_SERIAL_NUM_LEN];
    BYTE bySec_NetserverMode;
    BYTE bySec_QuickLockPassword;
    BYTE bySec_QuickBlank;
    BYTE bysec_DisketteBootControl;
    BYTE bysec_SerialPortAControl;
    BYTE bySec_SerialPortBControl;
    BYTE bySec_ParallelPortControl;
    BYTE bySec_FloppyDisketteControl;
    BYTE bysec_FixedDiskcontrol;
    char szSec_ChassisSerialNumber
            [SEC_CHAS_SERIAL_NUM_LEN];
BYTE bySec_FormFactor;
};
```

Members
  szSec_SysSerialNumber
    The serial number of the system unit.
    The string will be empty if the system does not report the serial number function.
  bySec_NetServerMode
    The state of the network server mode/ security lock override feature.
  bySec_QuickLockPassword
    The state of the quicklock password feature.
    See general feature value table below.
  bySec_QuickBlank
    The state of the quick blank screen feature.
    See general feature value table below.
  bySec_DisketteBootControl
    The state of the diskette boot control feature.
    See general feature value table below.
  bySec_SerialPortAControl
    The state of the access control for the primary serial port interface embedded in the Compaq system board.
    See general feature value table below.
  bySec_SerialPortBControl
    The state of the access control for the secondary serial port interface embedded in the Compaq system board. See general feature value table below.
  bySec_ParallelPortControl
    The state of the access control for the parallel port interface embedded in the Compaq system board.
  bySec_FloppyDisketteControl
    The state of the access control for the floppy diskette interface embedded in the Compaq system board.
  bySec_FixedDiskControl
    The state of the access control for the fixed disk interface embedded in the Compaq system board.
  szSec_ChassisSerialNumber
    The serial number of the chassis on this unit. The string will be empty if the system does not report this serial number function.
  bySec_FormFactor
  Sec_ChassisVideoNumber
    The serial number of the video display attached to this unit. The string will be empty if the system does not report this serial number function.
  General feature value table

| Value | Meaning |
| --- | --- |
| SECURITY_NOT_SUPPORTED | The feature is not supported on this hardware platform. |
| SECURITY_DISABLED | The feature is presently disabled. |
| SECURITY_ENABLED | The featured is enabled. |

©1995 Compaq Computer Corporation

The system board branch 1.16 contains information regarding the system board for the computer system 10. This information includes system board ID, revision level, manufacture date and product name. The formal structure of the system board branch 1.16 is as follows:

Input Hardware ID:
HW_SYS_BOARD
Input index structure:
  None.
Output structure:
  The SYS_BOARD structure describes features of your Compaq computer system board.
  struct SYS_BOARD {
    BYTEbySYSBRD_ProductID;
    WORDwoSYSBRD_SystemID;
    BYTEbySYSBRD_RevisionLevel;
    BOOLbSYSBRD_FlashRomSupport;
    charszSYSBRD_RomDate[ROM_DATE_LEN];
    char szSYSBRD_ProductName[PRODUCT_NAME_LEN];
  }
Members
  bySYSBRD_ProductID
    The machine product ID.
  woSYSBRD_SystemID
    This value indicates the Compaq system ID of the system board in this system.
  bySYSBRD_RevisionLevel
    The Compaq System ID:CPU Component.
    This value indicates the CPU type of the system board in this system. A value of zero (0) indicates that the CPU type cannot be determined.
  bSYSBRD_FlashRomSupport
    This value indicates if this system supports flash upgradable system ROM.

| Value | Meaning |
| --- | --- |
| FLASH_NOT_SUPPORTED | The hardware does not support this feature. |

-continued

| Value | Meaning |
| --- | --- |
| FLASH_SUPPORTED | This feature is supported by the hardware. | szSYSBRD_RomDate
  The manufacture date of the ROM BIOS.
szSYSBRD_ProductName
  The machine product name. The name of the Compaq machine used in this system.
©1995 Compaq Computer Corporation The system memory branch 1.17 contains information, including total system memory and total conventional memory, related to the total memory for the computer system 10. The formal structure of the system memory branch 1.17 is as follows:
  Input index structure:
    None.
  Output structure:
  struct SYS_MEM {
    DWORDdwSYSMEM_TotalMem;
    DWORDdwSYSMEM_BaseMem;
  }
    dwSYSMEM_TotalMem
      The total system memory which includes conventional and extended in kilobytes.
    dwSYSMEM_BaseMem
      The total conventional memory (below 1 megabyte) in the system.
©1995 Compaq Computer Corporation The system ROM branch 1.18 contains information regarding the system ROM of the computer system 10. Additionally, the system ROM branch contains data information maintained by the ROM code. The formal structure of the system ROM branch 1.18 is as follows:
  Input index structure:
    None.
  Output structure:
  The SYS_ROM structure contains system read-only memory (ROM) information as well as data information maintained by the ROM code.
  struct SYS_ROM {
    char szROM_date[ROM_DATE_STR_LEN];
    BYTE byROM_id;
    BYTE byROM_familyID1;
    BYTE byROM_familyID2;
    char szROM_family[ROM_FAMILY_STR_LEN];
    BYTE byROM_biosDataArea[ROM_BIOS_DATA_SIZE];
Members
  szROM_date
    The ASCIIZ date string of the ROM BIOS.
  byROM_id
  byROM_familyID1
    The family product code held at ROM location F000:FFE4h.
  byROM_familyID2
  byROM_biosDataArea
    The low BIOS data area as found at 40:00.
©1995 Compaq Computer Corporation The thermal branch 1.19 contains information regarding the thermal condition of the CPU of the computer system 10. The formal structure of the thermal branch 1.19 is as follows:
  Input Hardware ID:
    HW_THERMAL
  Input index structure:
    None.
  Output structure:
  The THERMAL structure contains information about the current condition of the system's CPU temperature.
  struct THERMAL {
    DWORDdwThermalCondition;
  }
Members
  Thrm_Condition
    Specifics the general condition of the CPU.

| Value | Meaning |
| --- | --- |
| TEMP_NORMAL | The CPU thermal temperature is in normal operating condition. |
| TEMP_CAUTION | The CPU thermal temperature in out of normal operating range. This can typically be cause by leaving the case off of the machine. |
| TEMP_CRITICAL | If CPU thermal temperature is in a critical state The machine should be turned off immediately. |

©1995 Compaq Computer Corporation

The video branch 1.20 contains information regarding the state of the video adapter for the computer system 10, including serial number, manufacture date, horizontal resolution, vertical resolution and refresh rate. The formal structure of the video branch 1.20 is as follows:
  Input Hardware ID:
    HW_VIDEO
  Input index structure:
    None.
  Output structure:
    The VIDEO_DESC structure contains description information about the state of the video adapter found in the machine.
  VIDEO_DESC {
    charszVIDEO_Description[VIDEO_DESC_LEN];
    BOOLbMonitorPresent;
    S_MIFRawEDID;
    charszMonitorModel[MONITOR_MODEL_LEN];
    charszMonitorSerNum[SERIAL_NUM_LEN];
    S_DATE MonitorDate;
    BYTEbyMaxHorizontal;
    BYTEbyMaxVertical;
    WORDwoMaxHorizontalPixels;
    WORDwoMaxVerticalPixels;
    WORDwoMaxRefreshRate;
    WORDwoEDIDVersion;
  }
Members
  szVIDEO_Description
    The ASCIIZ description of the video card.
  bMonitorPresent Boolean which indicates whether or not a monitor is present on this machine.

RawEDID
Data structure containing the Extended Display Identification (EDID) information.

szMonitorModel
The ASCIIZ monitor model description.

szMonitorSerNum
The ASCIIZ monitor serial number.

MonitorDate
Manufacture date of the monitor.

byMaxHorizontal
Maximum horizontal resolution in centimeters.

byMaxVertical
Maximum vertical resolution in centimeters.

woMaxHorizontalPixels
Maximum horizontal pixels.

woMaxVerticalPixels
Maximum vertical pixels.

woMaxRefreshRate
Maximum refresh rate.

woEDIDVersion
Extended Display Identification version.

The S_MIF contains information extracted from the extended display data (EDID) structure.

```
struct S_MIF
    BYTEbyMIF[MIF_HEADER_LEN];
    BYTEbyMIF_Manufacturer[MIF_MANUF_LEN];
    BYTEbyMIF_ProductCode[MIF_PCODE_LEN];
    BYTEbyMIF_SerialNumber[MIF_SERIAL_
        NUM_LEN];
    BYTEbyMIF_WeekManufactured;
    BYTEbyMIF_YearManufactured;
    BYTEbyMIF_EDID_Version;
    BYTEbyMIF_EDID_Revision;
    BYTEbyMIF_VideoInputDefinition;
    BYTEbyMIF_MaxHorizontalImageSize;
    BYTEbyMIF_MaxVerticalImageSize;
    BYTEbyMIF_DisplayTransferCharacteristic;
    BYTEbyMIF_FeatureSupport;
    BYTEbyMIF_Color[MIF_COLOR_LEN];
    BYTEbyMIF_EstablishedTimings1;
    BYTEbyMIF_EstablishedTimings2;
    BYTEbyMIF_ReservedTimings;
    BYTEbyMIF1[MIF_TRAILER_LEN];
}
```

Members byMIF
Monitor information file header.

byMIF_Manufacturer
EISA 3-character ID in compressed format.

byMIF_ProductCode
Vender Assigned Code byMIF_SerialNumber
32-bit serial number LSB first.

byMIF_WeekManufactured
Week number (0–53) use 0 if n/a.

byMIF_YearManufactured
(Year-1990)=year of manufacture.

byMIF_EDID_Version
Extended Display Identification version number.

byMIF_EDID_Revision
Extended Display Identification revision number.

byMIF_VideoInputDefinition
Video input definition.

byMIF_MaxHorizontalImageSize
Maximum horizontal image size in centimeters.

byMIF_MaxVerticalImageSize
Maximum vertical image size in centimeters.

byMIF_DisplayTransferCharacteristic
(Gamma×100)−100, [range 1.00 to 3.55]

byMIF_FeatureSupport
Feature support (DPMS)

byMIF_Color
Array as follows:

| Bytes | Color Characteristics | Based on 1931 CIE chart |
|---|---|---|
| 1 | RedGreenLowBits | Rx1 Rx0 Ry1 Ry0 Gx1 Gx0 Gy1 Gy0 |
| 1 | BlueWhiteLowBits | Bx1 Bx0 By1 By0 Wx1 Wx0 Wy1 Wy0 |
| 1 | Redx | Red x bit 9-2 |
| 1 | Redy | Red y bit 9-2 |
| 1 | Greenx | Green x bit 9-2 |
| 1 | Bluex | Blue x bit 9-2 |
| 1 | Bluey | Blue y bit 9-2 |
| 1 | Whitex | White x bit 9-2 |
| 1 | Whitey | White x bit 9-2 | byMIF_EstablishedTimings1 byMIF_EstablishedTimings2 byMIF_ReservedTimings

Two different sections are defined for indicating compliance with current and future timing standards. The first three bytes contain one-bit flags, used to indicate support for established VESA and other common timings in a very compact form. The next 16 bytes provide information on up to 8 additional timings, encoded as described in the Standard Timing Identification table defined below.

| Byte 1 | bit | Established Timings 1 | Source |
|---|---|---|---|
| | 7 | 720 × 400 @ 70 Hz | (VGA, IBM) |
| | 6 | 720 × 400 @ 88 Hz | (XGA2, IBM) |
| | 5 | 640 × 480 @ 60 Hz | (VGA, IBM) |
| | 4 | 640 × 480 @ 67 Hz | (Mac II, Apple) |
| | 3 | 640 × 480 @ 72 Hz | (VESA) |
| | 2 | 640 × 480 @ 75 Hz | (VESA) |
| | 1 | 800 × 600 @ 56 Hz | (VESA) |
| | 0 | 800 × 600 @ 60 Hz | (VESA) |

| Byte 2 | bit | Established Timings II | |
|---|---|---|---|
| | 7 | 800 × 600 @ 72 Hz | (VESA) |
| | 6 | 800 × 600 @ 75 Hz | (VESA) |
| | 5 | 832 × 624 @ 75 Hz | (Mac II, Apple) |
| | 4 | 1024 × 768 @ 87 Hz (interlaced) | (IBM) |
| | 3 | 1024 × 768 @ 60 Hz | (VESA) |
| | 2 | 1024 × 768 @ 70 Hz | (VESA) |
| | 1 | 1024 × 768 @ 75 Hz | (VESA) |
| | 0 | 1280 × 1024 @ 75 Hz | (VESA) |

-continued

| Byte 3 | bit | Reserved-Manufacturer's Timings | Manufacturers Specified Timing |
|---|---|---|---|
| | 7 | 1152 × 870 75 Hz | (Mac II, Apple) |
| | 6 | Reserved | Manufacturers Specified Timing |
| | 5 | Reserved | |
| | 4 | Reserved | |
| | 3 | Reserved | |
| | 2 | Reserved | |
| | 1 | Reserved | |
| | 0 | Reserved | |

Standard Timing Identification

The next 16 bytes provide identification up to 8 additional standard timings, each named by a unique 2-byte code which is determined from the display's format and refresh rate as described below. It is expected that this scheme may be used to identify future standard timings which were not included in the above table, and that it might also be used in monitors intended exclusively for use in proprietary systems wherein the host already has the complete timing information.

If fewer that eight timings are to be named in this section, the unused bytes should be set to 00h.

| Bytes | Standard Timing Identification |
|---|---|
| 1 | (Horizontal Active pixels /8)-31: The range of Horizontal Active Pixels which can be described in each byte is 256–2288 pixels, in increments of 8 pixels |
| 1 | Image Aspect Ratio: The vertical active line count may be calculated from this aspect ration and the horizontal active count given in the first byte; "Square" pixels (1:1 pixel aspect ratio) should always be assumed.<br>Bit 7   Bit 6   Operation<br><br>0       0       1:1 Aspect Ratio<br>0       1       4:3 Aspect Ratio<br>1       0       5:4 Aspect Ratio<br>1       1       16:9 Aspect Ratio<br>Refresh Rate:<br>Bit 5:0           Operation<br>                  (Refresh rate-60)<br>                  Range 60–123Hz<br>If fewer than eight timings are named in this section, unused bytes should be set to 00 h. | byMIF1
    Reserved.
©1995 Compaq Computer Corporation

Referring next to FIG. 4, a method of obtaining management information using the component structure 38 provided by the HCI 16 shall now be described in greater detail. In order to perform management operations, a management application must periodically collect information regarding the manageable devices associated therewith. Accordingly, the management application, for example, the CIM management application 24-3, will issue, at step 40, a request for information related to a selected manageable device via a management agent, for example, the SNMP agent 22-3. The structure of the requested information will vary according to the particular arrangement of manageable information within the management application. For example, the CIM management application 24-3 issues requests for information in accordance with the structure of the enterprise MIB 232 set forth in previously referenced U.S. patent application Ser. No. 07/933,920 (now U.S. Pat. No. 5,471,617).

Proceeding to step 42, a mapping subroutine of the management agent, for example, the mapper 30 of the SNMP agent 23-3 translates the location of the information requested by the CIM management application 24-3 to a corresponding data structure defined by the HCI component structure 38.

Continuing on to step 44, the HCI DLL 32 receives the management application request and points to corresponding calling conventions and parameters maintained in the function calls area 34 of the HCI 16 which are required in order to retrieve the requested information described by the HCI component structure 38. The location of each possible information request are stored in the function calls area 34 to enable the HCI DLL 32 to determine the destination of the information request. Accordingly, using the information contained within the call pointed to by the HCI DLL 32, the HCI DLL 32 determines whether to direct the management information request to the device 12-N, the storage facility 18 or the registry 20 and, at step 44, issues an instruction to the device 12-N, storage facility 18 or registry 20 which places the requested management information into the data buffer 36.

Proceeding on to step 46, the management information previously maintained at the device 12-N, storage facility 18 or registry 20 and placed in the data buffer 36 by the HCI DLL 32 is transmitted to the management agent, for example, the SNMP agent 24-2, via the data buffer 36. In turn, the management agent delivers the management information to the management application, for example, the CIM application 24-3, where it is used to manage the manageable devices 12-1 through 12-N associated therewith, for example, by monitoring the performance of the computer system 10 and respond to alerts or other abnormal conditions as they occur.

The calling conventions and parameters maintained in the function calls area 34 of the HCI 16 which are used by the HCI DLL 32 to obtain access to requested management information are as

| | | |
|---|---|---|
| OUT RET_CODE | // | <-Exit return code see "RET_xxx" (chci.h) |
| CHCIRequest( | // | General HCI request entry point |
| IN REQUEST_FUNCTION | | |
| requestId, | // | ->Symbolic constant associated with function. |
| | // | See 'REQUEST_' prefix (chci.h) |
| IN HARDWARE_ID | | |
| hardwareId, | // | ->Symbolic constant which is associated with |
| | // | a structure index. See 'HW_' prefix |
| IN DWORD | | |
| dwHWStrucOffset, | // | ->Offset from the beginning of the hardware |
| | // | structure (chci.h) |
| IN DWORD | | |
| dwHWStrucLen, | | |
| | // | ->Length from offset of structure information |
| | // | requested |

-continued

```
IN PVOID
    pvIndexStruc,
    // ->Address of index structure or NULL if
        no index
        // structure
OUT PVOID pvInfo
    // <- Address to place requested function
    structure // information
    );
```

Purpose

This function is responsible for retrieving of information associated with any Compaq hardware component symbolic constant. Appendix A contains sample functions which uses this interface to retrieve CPU cache and system board information. Note that the entry point is a C++ entry point. '→' indicates that it is an input parameter. '←' indicates that it is an output parameter.

Arguments requestId
    This is the symbolic constant passed by the caller which is associated with a particular request type. The constants are defined in CHCI.H with the 'REQUEST_' prefix.

hardwareId
    This is the symbolic constant which is passed by the caller which is associated with a particular hardware component structure. The constants are defined in CHCI.H with the 'HW_' prefix.

dwHWStrucOffset
    This is the offset from the beginning of the structure defined by infoStruc from which CPQHCI.DLL will retrieve information.

dwHWStrucLen
    This is the length from dwHWStrucOffset from this function will return information associated with pvinfo.

pvIndexStruc
    This a variable list of index(es) associated with enumerated components. The order and definition of this index is defined under in the 'Hardware Component Structure Definitions' section of this document. In the event that no index(es) are associated with the component, the caller is required to pass a NULL parameter.

pvInfo
    This is linear address of the buffer used this function to return the information associated with infoStruc.

Return Values

The following are the completion codes returned by CHCIRequest to the calling application.

| Value | Meaning |
|---|---|
| RET_SUCCESS_CODE | The information was successfully retrieved. |
| RET_INVALID_PARAMETER | An invalid argument was passed by the caller to the CHCIRequest function. |
| RET_COMMAND_NOT_SUPPORTED | Returned in the case of a particular feature not being supported by one type of machine or another. This return code can be returned by a request for HW_THERMAL information. |
| RET_CACHE_LEVEL_NOT_PRESENT | L2 or L3 cache level not present. |
| RET_OPTION_ROM_NOT_FOUND | Option ROM associated with option rom index is not present. |
| RET_DEVICE_INITIALIZATION_FAILURE | SCSI device initialization failed. |
| RET_UNKNOWN_ERROR | An error internal to CPQHCI.DLL has occurred. This is typically caused by an invalid configuration. |
| RET_REQUEST_FAILED | A system call issued by CPQHCI.DLL has failed. This may be caused by a corrupted system. |
| RET_NO_MORE_PCI_FUNCTIONS | There are no more function associated with the device index given by the caller requesting HW_PCI_FIND_NEXT_FUNC information. |
| RET_NO_MORE_PCI_FUNC_MEM | The are no more functions associated with the device index given be the caller requesting HW_PCI_FUNC_MEM information. |

Comments

An import library CPQHCI.LIB is provided for implicit loading of the DLL.

OUT RET_CODE APIENTRY
        // ← Return code—see RET_xxx (chci.h)
    CHCIGetVersion(
        // Retrieves CPQHCI.DLL major and minor version
    IN OUT DWORD *
        pdwMajMinVersion
        // < > Address to store major and minor version
        // Major number return in high word, minor
        // number returned in low word.
    );

pdwMajMinVersion
    Pointer to where the major and minor version numbers will be placed. The major version number will be filled out in the high word, the minor version number will be filled out in the low word.

©1995 Compaq Computer Corporation

The foregoing description has been directed to the retrieval, by management applications, of hardware based management information using a loosely coupled hardware component interface. It should be clearly understood, however, that the hardware component interface set forth above is equally suitable for use, by the aforementioned management applications, to set hardware based management information, for example, an asset tag. In such an embodiment of the present invention, in addition to the hardware component structure, the mapper 30 would also inform the HCI DLL 32, for example, using an indicator bit, as to whether the requested operation is a "get" operation in which hardware based management information is retrieved or a "set" operation in which hardware based management information is set and, in the event that a "set" operation is indicated, the value to which the information identified by the received hardware component structure and locatable using the call maintained in the function calls area 34 which corresponds to the received hardware component structure should be set.

Thus, there has been described and illustrated herein, a hardware component interface capable which eliminates the need for much of the information that a management application requires to manage a manageable device. In this manner, a loose coupling between plural management applications and manageable devices whereby the management application does not need to know the location of requested management information has been achieved. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A manageable computer system, comprising:
   a plurality of manageable devices;
   a corresponding plurality of device drivers;
   a plurality of management applications operative to manage a corresponding manageable device of the plurality of manageable devices by modifying or retrieving associated management information, each management application of the plurality of management applications using a first data structure to access management information in the computer system;
   a plurality of management agents, each coupled to a corresponding management application of the plurality of management applications, wherein each management agent translates management information between the first data structure and a second data structure;
   a component interface, coupled to each of the management agents and to the plurality of manageable devices via corresponding device drivers, the component interface using the second data structure to access management information for each of the plurality of manageable devices in the computer system and locational information to determine the location, within the computer system, at which the management information is maintained; and
   the component interface being operative to access management information from the computer system using the second data structure and the locational information and to propagate requested management information to corresponding management application via the corresponding management agent, the component interface further comprising:
   a dynamic linked library (DLL); and
   the DLL including the second data structure which describes available management information for each one of the plurality of manageable devices.

2. A manageable computer system according to claim 1 and further comprising:
   a first storage facility coupled to the component interface; and
   the management information being selectively maintained at either the first storage facility or at a manageable device to which specific management information pertains.

3. A manageable computer system according to claim 2 and further comprising:
   a second storage facility coupled to the component interface; the management information being selectively maintained at either the first storage facility, the second storage facility or at the manageable device to which specific management information pertains.

4. A manageable computer system according to claim 3 wherein the second storage facility is a registry.

5. A manageable computer system according to claim 3 the component interface further comprising:
   a function calls area comprising the locational information; and
   at least one pointer between the second data structure and the function calls area.

6. A manageable computer system according to claim 1 wherein the second data structure further comprises a plurality of device branches, each one of the plurality of branches describing the available management information for a corresponding one of the plurality of manageable devices.

7. A manageable computer system according to claim 6 wherein the plurality of device branches further comprises at least one of a CPU branch, a disk drive branch, a memory branch, a bus branch, an input/output port branch, a system board branch and a video branch.

8. A manageable computer system according to claim 6 wherein the second data structure further comprises a security branch which describes asset security features for the computer system.

9. A manageable computer system according to claim 6 wherein the second data structure further comprises a thermal branch which describes thermal conditions for the computer system.

10. A manageable computer system according to claim 1, wherein each management agent further comprises a mapper operative to translate management information between the first and second data structures.

11. A manageable computer system according to claim 1 further comprising:
    a plurality of management applications, each operative to manage at least one of the plurality of manageable devices, and each using a corresponding one of a plurality of management application data structures to modify or retrieve management information in the computer system; and
    a plurality of management agents, each coupled to the component interface and to a corresponding one of the plurality of management applications, each translating between a corresponding one of the plurality of management application data structures and the second data structure to enable access and retrieval of management information.

12. A method for managing a plurality of manageable devices of a computer system, comprising:
    generating a request, by a management application of a plurality of management applications, for access to management information in accordance with a first data structure;
    translating the request, by a management agent of a plurality of management agents, wherein each management agent corresponds to a management application of the plurality of management applications, to a request in accordance with a second data structure of a component interface;
    accessing the management information, by the component interface, using the second data structure and locational information, said accessing the management information further comprising using a pointer between the second data structure and a function calls area; and providing the management information, by the component interface and the management agent, to the management application.

13. A method of managing a plurality of manageable devices of a computer system according to claim 12 and further comprising:

generating a plurality of requests, each by a corresponding one of the plurality of management applications, for management information in accordance with a corresponding one of the plurality of management application data structures; and translating each request, by a corresponding one of the plurality of corresponding management agents, to a request in accordance with the second data structure.

14. A method of managing a plurality of manageable devices of a computer system according to claim 12 wherein said accessing the management information further comprises selectively accessing the management information from a first storage facility or from a manageable device to which the management information pertains.

15. A method of managing a plurality of manageable devices of a computer system according to claim 12 wherein said accessing the management information further comprises accessing the management information from a selected one of a first storage facility, a second storage facility and a manageable device to which the management information pertains.

16. A method of managing a plurality of manageable devices of a computer system according to claim 12 wherein said translating the request further comprises mapping management information between the first and second data structures.

\* \* \* \* \*